United States Patent
Patwardhan et al.

(10) Patent No.: US 12,452,654 B2
(45) Date of Patent: Oct. 21, 2025

(54) ENCRYPTION ENHANCEMENT FOR MULTI-LINK OPERATION IN 802.11

(71) Applicant: Hewlett Packard Enterprise Development LP, Spring, TX (US)

(72) Inventors: Gaurav Patwardhan, San Jose, CA (US); Daniel N. Harkins, San Jose, CA (US); Eldad Perahia, San Jose, CA (US); Sachin Ganu, San Jose, CA (US); Nitin A. Changlani, San Jose, CA (US); Mohd Shahnawaz Siraj, San Jose, CA (US); Abhiruchi Dakshinkar, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 206 days.

(21) Appl. No.: 18/043,069

(22) PCT Filed: Aug. 27, 2021

(86) PCT No.: PCT/US2021/047991
§ 371 (c)(1),
(2) Date: Feb. 27, 2023

(87) PCT Pub. No.: WO2022/047180
PCT Pub. Date: Mar. 3, 2022

(65) Prior Publication Data
US 2023/0319550 A1    Oct. 5, 2023

Related U.S. Application Data

(60) Provisional application No. 63/071,179, filed on Aug. 27, 2020.

(51) Int. Cl.
*H04W 12/03* (2021.01)
*H04W 12/06* (2021.01)
*H04W 12/106* (2021.01)

(52) U.S. Cl.
CPC .......... *H04W 12/03* (2021.01); *H04W 12/06* (2013.01); *H04W 12/106* (2021.01)

(58) Field of Classification Search
CPC ... H04W 12/03; H04W 12/06; H04W 12/106; H04W 76/15; H04L 9/0637
See application file for complete search history.

(56) References Cited

U.S. PATENT DOCUMENTS

2015/0271137 A1   9/2015   Seok
2017/0331794 A1   11/2017  Lokman et al.
(Continued)

FOREIGN PATENT DOCUMENTS

WO   2020/146401 A1   7/2020

OTHER PUBLICATIONS

European search report and Search Opinion, EP App. No. 21862838.6, Jun. 14, 2024, 19 pages.
(Continued)

*Primary Examiner* — El Hadji M Sall
(74) *Attorney, Agent, or Firm* — Hewlett Packard Enterprise Patent Department

(57) ABSTRACT

Systems and methods are provided for encryption enhancement for a multi-link operation. Various subsets of addresses (or all addresses) associated with the frame are set to a determined known value, allowing encryption of the mac protocol data unit (MPDU) at a controller without knowledge of which particular link the frames will be sent. The multi-link devices (MLDs) used in the above communication may conduct communications in compliance with the IEEE 802.11be standard.

20 Claims, 8 Drawing Sheets

(56) References Cited

U.S. PATENT DOCUMENTS

2020/0045534 A1    2/2020  Thakore et al.
2020/0267541 A1    8/2020  Huang et al.
2021/0045008 A1*   2/2021  Bajko .................. H04W 12/03

OTHER PUBLICATIONS

Partial Supplementary European Search Report received for EP Patent Application No. 21862838.6, mailed on Mar. 13, 2024, 15 pages.
International Search Report and Written Opinion received for PCT Patent Application No. PCT/US21/47991, mailed on Dec. 10, 2021, 9 pages.
Q2IEEE P802.11, "Specification Framework for TGbe", Aug. 2020, 46 pages.
Duncan Ho et al., 'MLA: MAC Address Security', doc.: IEEE 802.11-20/0727r0, Jun. 29, 2020, Slides 2-9 1-20.
Huizhao Wang et al., 'Multi-Link Security and Aggregation Operations', doc.: IEEE 802.11-19/1963r, 1, Jan. 15, 2020, Slides 2-10 1-20.
Po-Kai Huang et al., 'Multi-link Security Consideration', doc.: IEEE 802.11-19/1822r9, May 5, 2020, Slides 2-10.

* cited by examiner

Table 1 Address field contents

| To DS | From DS | Address 1 | Address 2 | Address 3 | | Address 4 | |
|---|---|---|---|---|---|---|---|
| | | | | MSDU and Short A-MSDU case | Basic A-MSDU and Dynamic A-MSDU case | MSDU and Short A-MSDU case | Basic A-MSDU and Dynamic A-MSDU case |
| 0 | 0 | RA = DA | TA = SA | BSSID | BSSID | N/A | N/A |
| 0 | 1 | RA | TA = BSSID | SA | BSSID | N/A | N/A |
| 1 | 0 | RA = BSSID | TA | DA | BSSID | N/A | N/A |
| 1 | 1 | RA | TA | DA | BSSID | SA | BSSID |

FIG. 7

ENCRYPTION ENHANCEMENT FOR MULTI-LINK OPERATION IN 802.11

RELATED APPLICATIONS

This application claims the benefit of and priority to U.S. Provisional Patent Application No. 63/071,179, filed on Aug. 27, 2020, the contents of which is incorporated herein by reference in its entirety.

BACKGROUND

The IEEE 802.11be standard includes standards for multi-link operations (MLOs).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7 shows a table representing an example of the address field contents.

The figures are not exhaustive and do not limit the present disclosure to the precise form disclosed.

DETAILED DESCRIPTION

Multi-link devices (MLDs) may communicate with one another using multiple links (e.g., 2.4 GHz, 5 GHz, 6 GHz). Having multiple links to choose from increases throughput. Secure MLD operation (e.g., access points (APs) or other MLDs) involves encrypting frames of a message. Each frame may include a header, a preamble, and error checking information. The preamble may include a code indicating the start of a frame.

Some fields associated with a frame cannot be changed after encryption (i.e., header addresses), in accordance with the current 802.11 standard. These fields may be used for decryption and so if these fields are changed after encryption, the recipient, in addition to not being able to authenticate the sender, may not have enough information to decrypt the message. Some of the header addresses that cannot be changed determine which link the MLD uses for sending the message. Consequently, the message may not be decryptable by the intended recipient.

Accordingly, various subsets of addresses (or all addresses) associated with a frame are set to a determined known value (e.g., the various subsets of addresses may be zeroed out), allowing encryption of the media access control (MAC) protocol data unit (MPDU) at a controller without knowledge of which particular link the frames will use for sending the frame. Specifically, although the fields may be set to any value (or pattern of values) that is known to the recipient (or that is sent to the recipient in time for decryption), some embodiments involve the address fields being zeroed. However, zeroing the address fields is just one example of replacing some addresses with the determined known values. Modifying these address fields will allow the recipient to decrypt the message.

Figure 1:
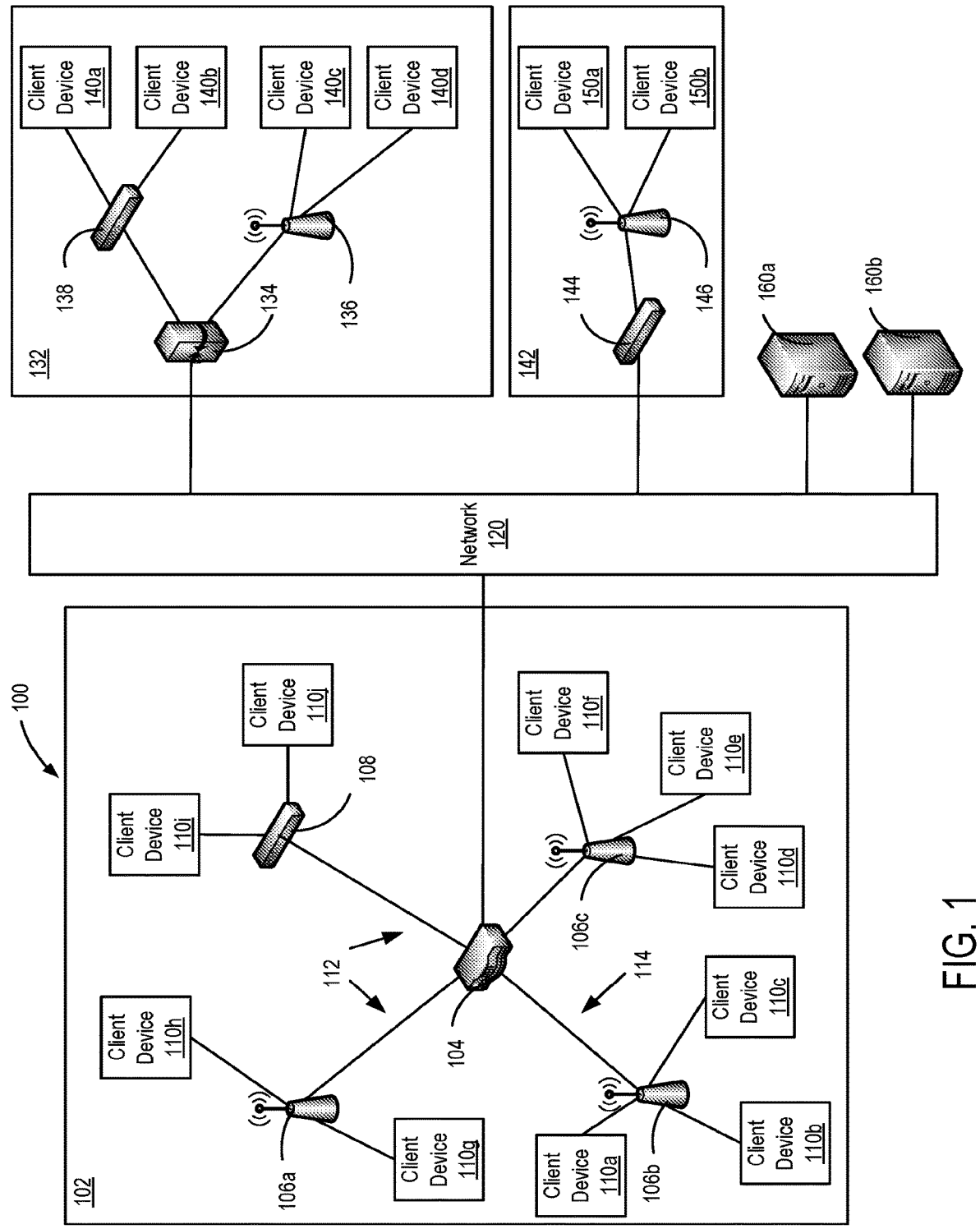
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, the primary site 102 includes a controller 104, which is in communication with the network 120. The controller 104 may provide communication with the network 120 for the primary site 102. There may be other points of communication with the network 120 for the primary site 102 in addition to controller 104. Although single controller 104 is illustrated, the primary site 102 may include multiple controllers and/or multiple communication points with network 120, any combination of which may be MLDs. In some embodiments, the controller 104 may communicate with the network 120 through a router 110$k$, which may also be an MLD capable of multi-link tunnel communications that are compliant with IEEE 802.11 standard. In other embodiments, the controller 104 provides router functionality to the devices in the primary site 102. In this specification, the word "tunnel" refers to an encapsulated mode of transporting data between AP and controller.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point. The controller 104 may be or include an MLD, which may be capable of multi-link tunnel communications compliant with IEEE 802.11 standard.

The controller 104 may be in communication with one or more switches 108 and/or wireless access points (APs) 106$a$-$c$. Wireless access points (APs) 106$a$-$c$ and switches 108 may also be an MLD that is capable of multi-link tunnel communications are compliant with IEEE 802.11 standard.

Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired or wireless 112 connection. In the illustrated example, the switch 108 communicates with the controller 104 over a wired or wireless 112 connection.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the example of FIG. 1, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be a satellite office, another floor or suite in a building, for example. The remote site 132 may include a gateway device 134 for communicating with the network 120. A gateway device 134 may be a router, a digital-to-analog modem, a cable modem, a digital subscriber line (DSL) modem, or some other network device configured to communicate with the network 120. The remote site 132 may also include a switch 138 and/or AP 136 in communication with the gateway device 134 over either wired or wireless connections. The switch 138 and AP 136 provide connectivity to the network for various client devices 140a-d. Gateway device 134, AP 136, and switch 138, may be MLDs that are capable of multi-link tunnel communications compliant with the IEEE 802.11 standard.

In various embodiments, the remote site 132 may be in direct communication with primary site 102, such that client devices 140a-d at the remote site 132 access the network resources at the primary site 102 as if these client devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. The gateway device 144 and the wireless AP 146 may be MLDs that are cable of multi-link tunnel communications compliant with the IEEE 802.11 standard. Such a remote site 142 may represent, for example, an individual employee's home or a temporary remote office. The remote site 142 may also be in communication with the primary site 102, such that the client devices 150a-b at the remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. The content servers 160a-b may include various providers of multimedia downloadable and/or streaming content, including audio, video, graphical, and/or text content, or any combination thereof. Examples of content servers 160a-b include web servers, streaming radio and video providers, and cable and satellite television providers. The client devices 110a j, 140a-d, 150a-b may request and access the multimedia content provided by the content servers 160a-b. The content servers 160a-b may be MLDs that are cable of multi-link tunnel communications compliant with the IEEE 802.11 standard. The portions of network 120 and/or the individual sites 102, 132, 142, may utilize dynamic frequency selection (DFS) channels for communication.

As an example, communication over a secure tunnel may exist between controller 104 and AP 106a-c. Having multi-link communications increase the throughput. However, were tunnel communications used in prior multi-link communications, the recipient would not be able to decrypt the data, because the recipient would not know which link was chosen.

Figure 2:
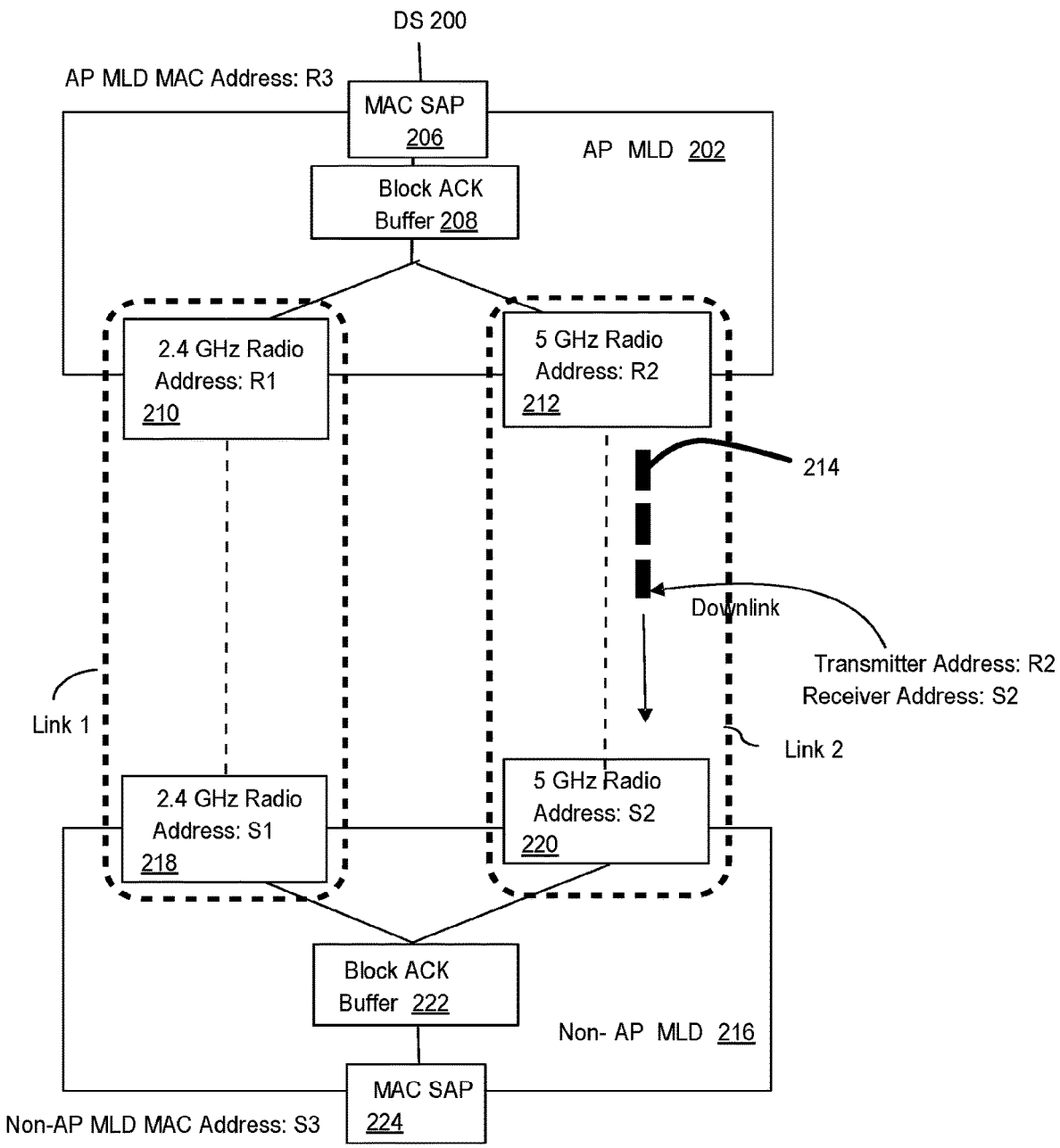
FIG. 2 illustrates an example multi-link device (MLD) communication.

FIG. 2 illustrates an MLD communication 200. In FIG. 2 a message comes from a distribution system (DS) 200, such as a network, to an access point, AP MLD 202. In FIG. 2, a message from DS arrives at AP MLD 202, via media access control layer-service access point (MAC-SAP) 206 and waits in a queue in block ack (BA) buffer 208 to be sent to Non-AP MLD 216. The message is sent via either Link 1 or Link 2. During multi-link operations (MLO), multiple 802.11 devices with multiple radios may operate simultaneously on multiple channels, which may carry multiple frequencies (e.g., 2.4 GHz, 5 GHz, 6 GHz or other frequencies). Frames from a single traffic session can be sent on multiple links using the first available link (Link 1 or Link 2). Each link may be a unique wireless channel (as defined in the 802.11 standard). If the message is sent via Link 1, the message is sent from address R1 across interface 210 to address S1 across interface 218. If the message (e.g., frame 214) is sent via Link 2, the message travels from address R2 across interface 212 to address S2 across interface 220. Whether the message arrives via interface 218 or 220, the message waits in a queue at BA buffer 222, to be sent to DS, via MAC SAP 224. MLO allows a non-AP MLD 216 to send/receive data to/from AP MLD 202 over multiple links (Link 1 and Link 2). In the example of FIG. 2, a non-AP MLD 216 is associated with AP MLD 202 that is sending frames on the downlink (DL) on 'Link 2' in the 5 GHz frequency range.

Sending data from a traffic session using the first available channel (selected from multiple channels) can improve throughput and reduce latency. The MLDs, AP MLD 202 and non-AP MLD 216, may be logical entities defined by the IEEE 802 family of standards to interface multiple MAC/physical layer (MAC/PHY) systems with each other. AP MLD 202 and non-AP MLD 216 may each have a single MAC-SAP (206 and 224) interface to the upper layers, so that the upper layers do not need information about the links on which the MLD is operating. Within the MLD, there may be one or more client devices where each client device may be a MAC-PHY instance operating on a link. To make the operation efficient, authentication may be performed by the MLDs so that the client devices do not need to establish connections separately on each link, and the MLDs can perform a single setup for multiple links.

A collection of frames 214, which may be sent on the downlink (DL), can just as well be sent fully on 'Link 1,' fully on 'Link 2,' or partially on 'Link 1' and partially on 'Link 2'. This is because both the non-AP MLD 202 and AP MLD 216 share the same buffer for the BA agreement for both the links. The BA agreement may specify the capability of the sender and receiver and the policy for sending messages. In other words, the common buffer for BA agreement allows frames 214 to be sent on either or both Links 1 and 2.

For the AP MLD 202, in addition to radio addresses R1 and R2, address R3 is defined which identifies the AP MLD entity. A similar address is defined for the non-AP MLD, which in this case is client device S3. The MLDs may be any device that has the capability to use the 802.11be standard, such as a laptop computer, a desktop PC, PDA access point or Wi-Fi phone. The MLD may be fixed, mobile, or portable. The MLD may be a transmitter or receiver, and the MLD may include a media access control (MAC) and physical layer (PHY) interface to the wireless medium (WM).

Since the non-AP MLD 216 can send/receive frames over multiple links to/from an AP simultaneously, the throughput of the non-AP MLD 216 is higher than if were there only one link available. Also, since the non-AP MLD 216 can communicate using both Link 1 and Link 2 independently, the average channel access delay is reduced, thus improving latency.

There may exist a single association and a security context between a non-AP 216 MLD and AP MLD 202. Consequently, a single encryption key may be derived by both the MLDs to be used for encrypting/decrypting frames for both Links 1 and 2. Along with the common BA buffer 208 or 222, this allows the flexibility required to send frames over any link without much processing or queueing delay.

Figure 3:
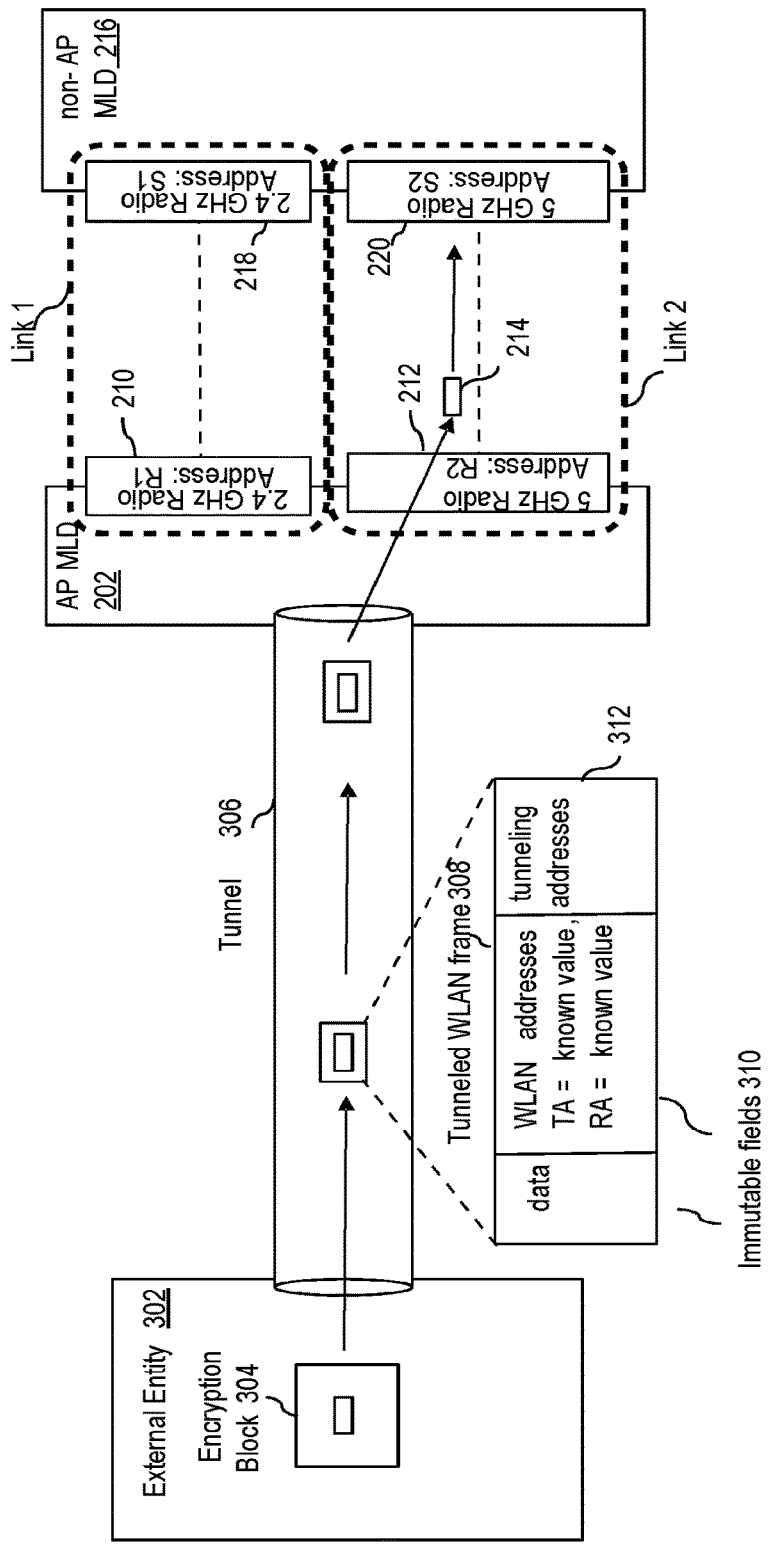
FIG. 3 illustrates an example of an MLD communication using a secure tunnel.

FIG. 3 illustrates an example of an external keyholder for encryption with a secure tunnel between the keyholder and AP MLD. In the example of FIG. 3, an external entity 302 encrypts the message as encryption block 304, encapsulating the frames of the message. Frame 308 illustrates an example of the structure of a frame sent over tunnel 306. Tunneled WLAN frame 308 may include tunneling addresses. Tunneled WLAN frame 308 may also include immutable fields 310, which may include data, which may be the body of the message, and fields TA and RA, which have been set to defined known values. The fields TA and RA may be set to different values. In prior systems the fields TA and RA would have been WLAN addresses (e.g., address TA=R2 and address RA=S2, which are the sender and receiver addresses 212 and 220 on Link 2). However, the immutable fields 310 cannot be changed after encryption when following the IEEE 802.11 standard. Consequently, since the AP MLD 202 cannot change the WLAN addresses, were one to attempt tunnel encryption, the address, TA and RA, used during encryption and the addresses used for sending the message would have a probability of being different, and consequently, the recipient would not know the correct address used for encryption, preventing decryption. The transmission of frame 214 between AP MLD 202 and non-AP MLD 216, via Link 2, was described in conjunction with FIG. 2.

Figure 4:
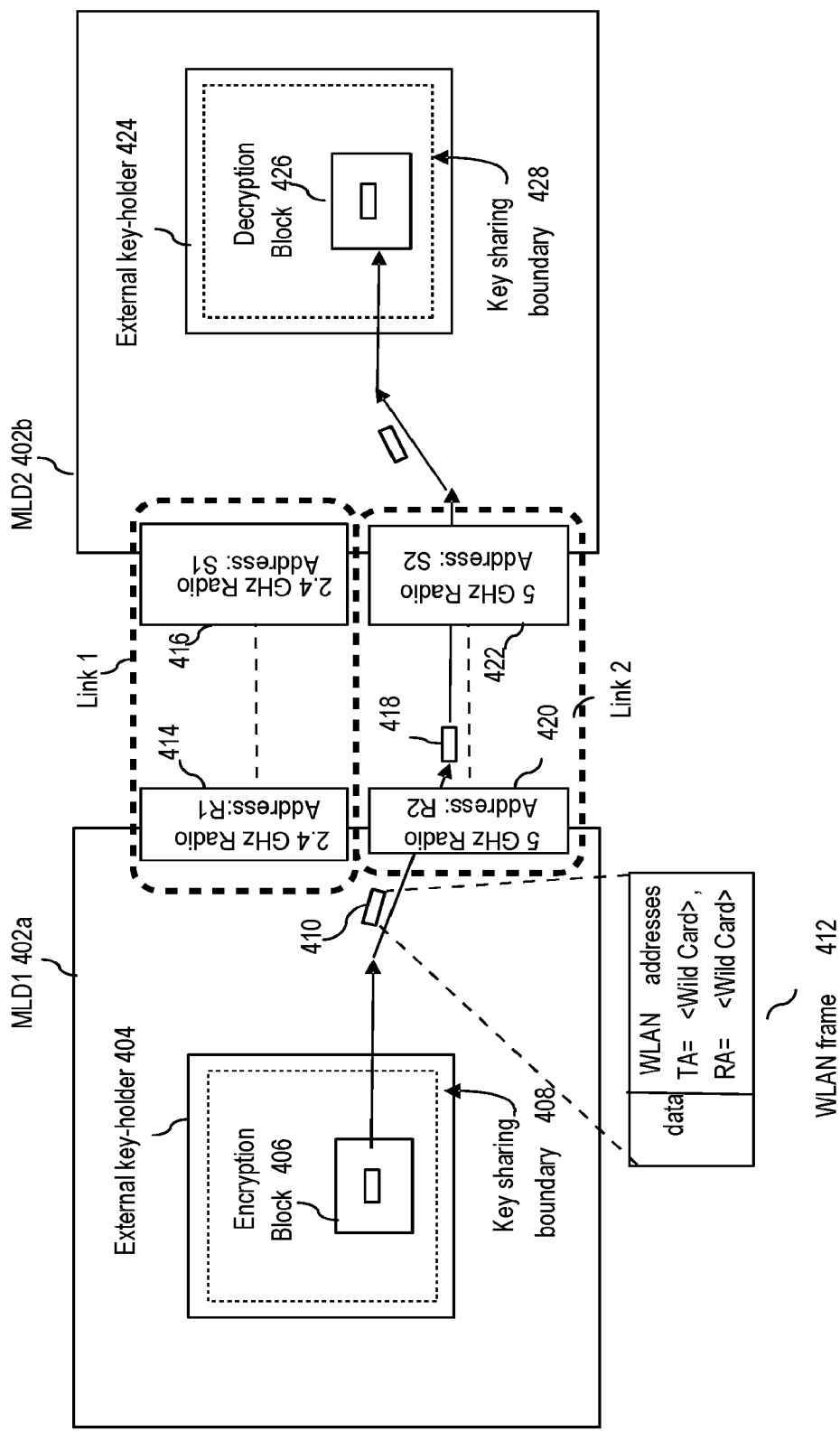
FIG. 4 illustrates another example of an MLD communication.

The system of FIG. 4 is similar to the system of FIG. 3. However, in FIG. 4, external keyholder 404 encrypts the message inside key sharing boundary 408, and external keyholder 404 encapsulates the message within encryption block 406. Frames 418 and 410 were encrypted by MLD1, via encryption block 406. A block diagram of an example of the structure of frame 410 is illustrated as WLAN frame 412, which includes data and WLAN addresses TA=<Wildcard> and RA=<Wildcard>, which are addresses that may be modified. Subsequently, the MLD1 decides the link to send the frame on to MLD2 and populates TA and RA addresses accordingly. For example, MLD1 selected Link 2 and sent frame with TA=R2 and RA=S2. In FIG. 4, the transmission occurs in a manner similar to that described in FIG. 2. Addresses 414, 416, 420, and 422, may be embodiments of addresses 210, 218, 212, and 220, respectively. After transmission, the frame is decrypted by external key holder 424 which contains the decryption block 426, within key sharing boundary 428.

Figure 5:
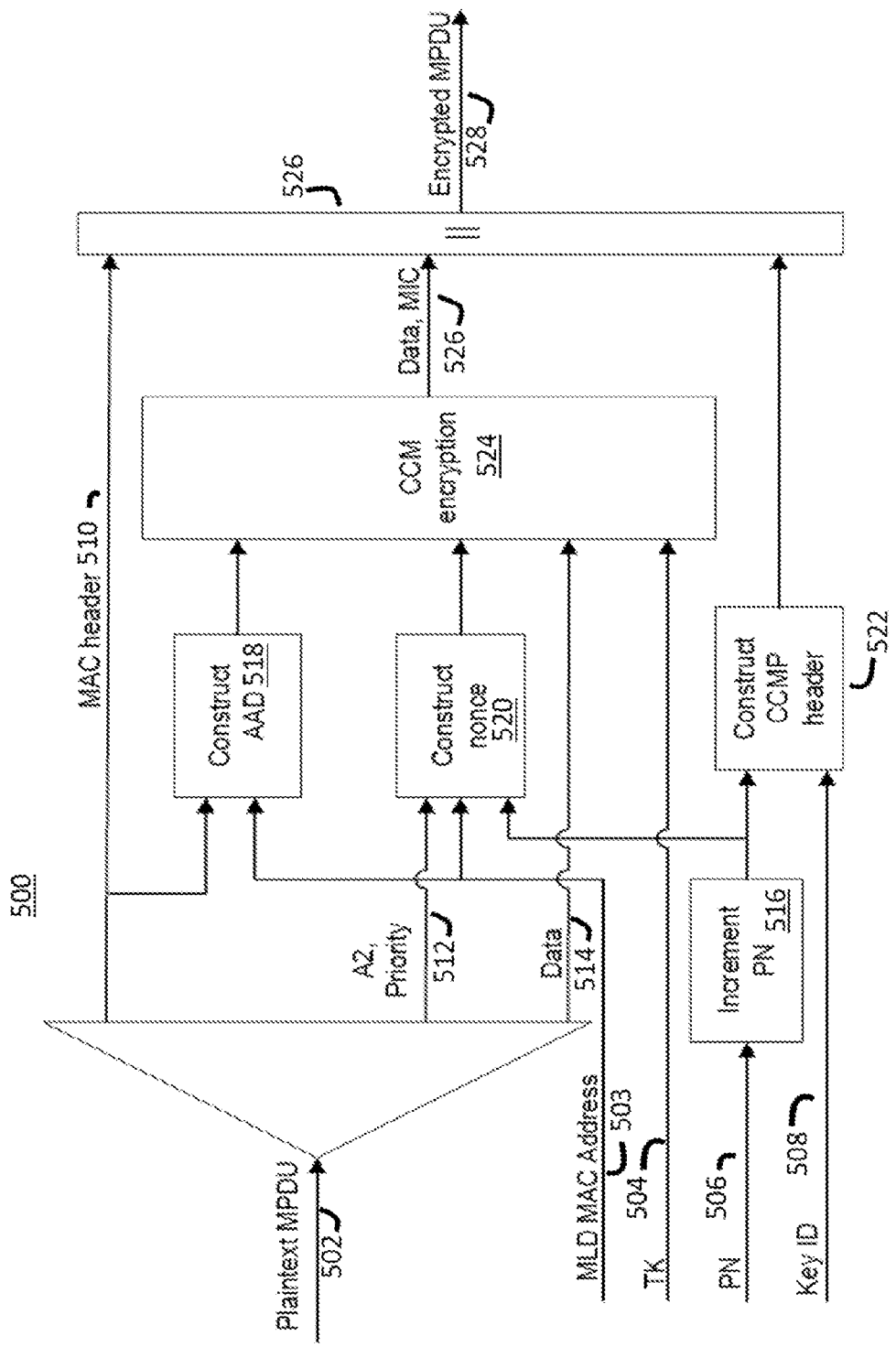
FIG. 5 illustrates a block diagram of an example of an encryption component.

FIG. 5 illustrates a block diagram of an encryption component 500. Encryption component 500 receives plain text MPDU 502, temporal key 504, packet number 506, and key ID 508. Packet number 506 is used by the logical element labeled increment PN 516 to increment the packet number. The MAC header 510 and the MLD MAC Address (5xx) 503 is used by the logical element labeled construct AAD 518 to construct, derive, or generate additional authentication data (AAD) (when the term "construct" or to construct are used herein, the terms "generate," "derive," to generate, or to derive may be substituted). The priority, the incremented packet number, and MLD MAC Address (5xx) are combined by the logical element labeled Construct nonce 520 to construct a nonce (for encrypting the data). The incremented packet number and Key ID 508 are used by the logical element labeled construct CCMP header 522 to construct the CCMP header. The AAD, nonce, data, and temporal key are used by CCM encryption 524 to encrypt the data and create the message integrity check (MIC). MAC header 510, data, MIC, and CCMP header are combined to form encrypted MPDU 528. The MIC provides information for checking the integrity of the encrypted data and information in the header.

Thus, in FIG. 5, the plaintext MPDU is the input on the left (among others) and the output on the right is an encrypted MPDU. The encryption block (CCM encryption 524) is where encryption takes place. As can be seen near the top of FIG. 5, the MAC header 510 is passed through directly to the end (526) without being encrypted itself. The MAC header 510 is given as an input to construct AAD 518, for constructing the Additional Authentication Data (AAD) block, which sets mutable fields to a known value in the MAC header before passing the AAD to the encryption block (CCM encryption 524). The final block 526 combines MAC header 510, encrypted data, MIC and header (526) to generate the final encrypted MPDU 528. The MLD that receives this frame is assured of the integrity of the fields in the MAC header 510, because of the AAD used to generate the MIC (at 526).

The same process of setting certain fields in the MAC header 510 to known values as an input to the AAD (outlined above) may be implemented with both CCM (CTR with CBC-MAC) and GCM (Galois/Counter Mode).

In some network architectures all the traffic between the Distribution System (DS) 200 and the AP (e.g., AP MLD 202) may be transmitted through the controller (e.g. controller 104).

The system may allow modes of operation including:

1.) De-tunnel mode—Traffic sent to the AP from the controller 104 is unencrypted. The encryption component within AP MLD 202, and the AP encrypts the traffic on the fly and sends traffic on the downlink (DL) to the wireless client. Similarly, the traffic received at the AP MLD 202 from the wireless client, 110*a-j*, is decrypted on the AP before sending the traffic to the controller. As an example, in FIG. 1, AP 106A-C can use the de-tunnel mode to send downlink traffic from controller 104 to wireless client 110A-C. Similarly, the frames received by the AP 106A-C on the up link (UL) from the wireless client 110B can be sent in de-tunnel mode to the controller 104.

2.) Tunnel mode—The traffic that is sent to one of AP 106*a-c* from the controller 104 is encrypted on the controller 104. Likewise, the traffic sent by the wireless client (e.g., one of clients 110*a-k*) is sent to the controller 104 directly where it is decrypted. The encryption keys (PTK and GTK) never leave the controller 104. So, the tunnel mode has better security than de-tunnel mode.

As shown in FIG. 5, encrypting frames requires an AAD as an input. Some of the fields which in prior systems are not zeroed out during encryption include the address fields (address 1, address 2, address 3, address 4) in the MAC header. In a mesh network, the frame may need to traverse multiple access links and multiple access points maybe traversed. Address 3 may be the address of an access point that is associated a client involved in the communication. More generally, the usage of addresses 3 and 4 may depend on the topology of the network. In a mesh network, address 3 and 4 are the address of the ingress and egress of the mesh network. This means after encryption of the MPDU, the addresses in the header cannot be changed according to the current IEEE 802.11 standard. This poses a problem for tunnel mode, because, the traffic to be sent on the DL from an AP MLD to a non-AP MLD has to be encrypted at the controller and that means the link to send the DL frame on has to be chosen a priori at the controller. This creates a highly inflexible system where the benefits of dynamically selecting link(s) for frame transmission are reduced.

The inventors have identified a variety of solutions to the issues discussed above and shown in the associated FIGs. These solutions may be combined, implemented in whole or in part, or otherwise used to arrive at the desired results in any manner now known or later developed.

Proposed Solutions

Mechanism 1

In accordance with a first mechanism, address 1 (RA) and address 2 (TA) in the AAD are set to a known value. The AAD is used for encryption and MIC generation. This is in turn allows the MPDU to be encrypted at a external key holder (e.g. controller) without the knowledge of a particular link (on a particular AP MLD) from which the frame will be sent out.

Mechanism 2

In accordance with a second mechanism, address 1 (RA), address 2(TA) and address 3 (BSSID) are set to a known value in the AAD used for encryption and MIC generation. For example, this allows the MPDU to be encrypted at an external key holder (e.g., controller) without the knowledge of a particular link and a particular AP MLD from which the frame will be sent out on.

Mechanism 3

Mechanism 3 is the same as Mechanisms 1 and 2, but Mechanism 3 involves setting all the address fields (i.e. address 1, address 2, address 3, address 4) to known values. This is useful in some mesh-AP related use cases. This concept of replacing addresses with a determined known value (for example all zeros) for controller+tunnel mode AP can be extended to any implementation of AP or non-AP MLD where the encryption of an MPDU and transmission of that same MPDU are not performed by the same entity (either virtual or physical). An example of this extension would be a non-AP MLD applying this mechanism for the UL traffic.

It should be noted that embodiments have been described in the context of CCMP encryption, but may also be applied to Galois/counter mode protocol (GCMP) wherever applicable.

Signaling

Signaling may be useful so that the receiving MLD can set the required fields in the AAD to known values before proceeding to decrypt and verify the integrity of the received frame. Signaling can be performed by setting (to 0 or 1) a specific bit in an element within management or control frames sent out by the AP or non-AP MLD. This bit signals for a specific address field to be set to a known value, prior to, or coincident with, the establishment of the association and security context. Multiple address fields intended to be set to known values may be signaled individually by different bits. Alternatively, fewer bits may be used, as long as some combinations of which addresses are set to a defined known value are never used. For example, only two bits need to be used to allow for the three mechanisms discussed above. If both bits are zero, may be used to indicate that an external key holder is not in use. The combination bits are 01, may indicate that the protocol is in use, and address 1 and address 2 have been set to known values. The combination of bits 10, may indicate that address 1, address 2, and address 3 are set to known values. The combination of bits 11, may be used to indicate that addresses 1-4 have been set to known values. Since that covers all three mechanisms, no further bits are needed. Nonetheless, dedicating one bit for each address, to indicate whether the address has been set to a known value provides more flexibility.

Figure 6:
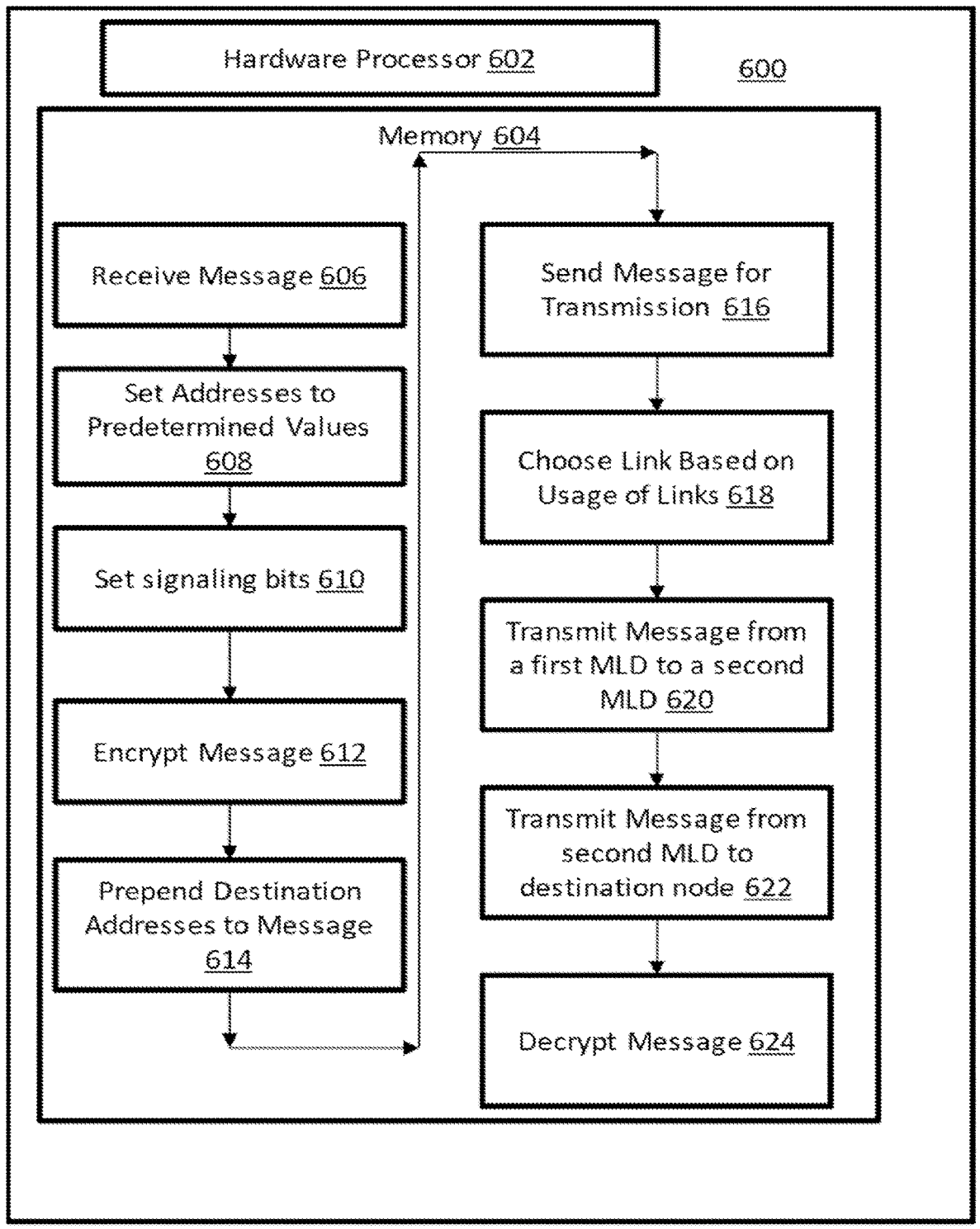
FIG. 6 illustrates a computing component and a flowchart of an example of a method for communications between MLDs that is implemented by the computing component.

FIG. 6 illustrates an example of a computing component 600 for implementing communication between MLDs. Computing component 600 may include hardware processor (s) 602.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-624, to control processes or operations for optimizing the system during run-time. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, random access memory (RAM), non-volatile RAM (NVRAM), an electrically erasable programmable read-only memory (EEPROM), a storage device, an optical disc, and the like. In some embodiments, machine-readable storage medium 604 may be a non-transitory storage medium, where the term "non-transitory" does not encompass transitory propagating signals. Non-transitory media is distinct from but may be used in conjunction with transmission media. Transmission media participates in transferring information between non-transitory media. As described in detail below, machine-readable storage medium 604 may be encoded with executable instructions, for example, instructions 606-624.

Hardware processor(s) 602 may be configured to implement the following steps. Hardware processor 602 may be a logic circuit that is configured to implement steps. Alternatively, the following steps are stored in memory 604 as machine instructions, which are read and implemented by hardware processor(s) 602.

In step 606, a message is received for transmission. In an embodiment, in step 608, header fields of one or more addresses are optionally set to a determined known value. In optional step 610, signaling bits are set to indicate which addresses to ignore. In step 612, the message is encrypted. If step 608 is performed, step 610 may be optional. If the signaling bits are not included in the immutable data, then step 610 may be performed any time prior to sending the message, so long as the signaling bits are received in time for decryption. In step 614, address information is prepended to the message. In step 616, the message is sent to a first MLD for transmission. Optionally, the first MLD may decrypt the message prior to or as part step 618. In step 618, the first MLD chooses the link on which to send the message. In step 620, the message is transmitted on the chosen link to the second MLD. In step 622, the message is then forwarded from the second MLD to the destination, optionally based on the prepended information. In step 624, the message is decrypted. As mentioned above, step 624 may occur prior to or part of step 618.

For example, a system 600 comprises a processor 602; a non-transitory memory storing machine instructions, which when executed causes the processor to: receive at a first multi-link component of a network device encrypted data (step 606), the encrypted data having a header that was modified to include a known value, the encrypted data being data that was encrypted when received by the first multi-link component, the encrypted data comprising content that is different than content of the header, the known value being known to the first multi-link component, the known value having a value that is not dependent on a link of multiple links that will be selected; and choose, by the first multi-link component (step 618), the link from the multiple links (Link 1 or Link 2) to send the data that was encrypted when received; and send the data that was encrypted when received on the link chosen to a second multi-link component (step 620).

In various embodiments, the system or method may include any of the following features. The header was modified by changing a value in a field for an address associated with the second multi-link component that is linked to the first multi-link component, the value in the field being changed to a value that is not the address associated with the link of the multiple links that was chosen In various embodiments, the system or method may include any of the following features. The machine instructions, which when executed, further cause the processor 602 to: process an address that was prepended to the encrypted data (step 614). The header comprising a first field for an address of a recipient multi-link component and a second field for an address of the first multi-link component, which sends messages to the recipient multi-link device, the recipient multi-link component being the second multi-link component, the first field being modified to have a value that is different than an address of the second multi-link component, and the second field being modified to a value that is different from an address of the first multi-link component. The header further comprising a third field that was modified, the third field being for an address of an access point; after being modified, the third field has a value that is different than the address of the access point. The header further comprising: a fourth field for a fourth address, the fourth field being modified to have a value that is different than the fourth address.

In various embodiments, the system or method may include any of the following features. The header and the encrypted data being part of a communication that is compliant with an IEEE 802.11 standard. The additional authentication data (AAD) block being based in part on the header. The encrypted data (encryption block 304 or 406) comprising a message integrity check (MIC). The encrypted data (encryption block 304 or 406) comprising an MPDU. A device from which the data was received is a controller, the controller comprising the encryption component. The network device is an access point (e.g. AP MLD 202).

For example, system 600 comprises: a processor 602, a non-transitory memory 604 storing machine instructions, which when executed causes the processor 602 to: modify, by an encryption component (e.g. external entity 302 or external key holder 404) of a network device, information in a block comprising authentication data; encrypting data based on the information that was modified to form encrypted data that is associated with the block; and the encrypted data comprising content that is different than content of the block; wherein the encrypting of the data based on the information that was modified enables the encrypted data to be decrypted no matter which link of multiple links (Link 1 or Link 2) is selected.

For example, system 600 comprises: a processor 602; a non-transitory memory 604 storing machine instructions, which when executed causes the processor to: modify, by an encryption component of a network device, information in a block to include a known value (step 608), the information in the block comprising authentication data, the known value chosen is not based on a link of multiple links that will be selected by a multi-link component; encrypt data (step 612) based on the information that was modified to form encrypted data that is associated with the block; and the encrypted data comprising content that is different than content of the block; and send the encrypted data to the multi-link component (step 618), for transmitting the data that was encrypted.

In various embodiments, the system or method may include any of the following features. The block comprising header information. The machine instructions, which when executed cause the processor 602 to: encrypt data at the encryption component to form the encrypted data (e.g., encryption block 304 or 406), and send the encrypted data to the multi-link component (e.g. AP MLD 202), where the encrypted data is received. The encryption component (e.g. external key holder 404) and multi-link component being part of the same device (e.g., MLD1 402a). The network device (external entity 302) being a controller.

As another example, a system comprises: a processor 602; a non-transitory memory 604 storing machine instructions, which when executed causes the processor 602 to: determine at a component of a network device (AP MLD 202 or MLD1 402a) that a field of a received-message is set to a value that indicates that encryption is based on a known value instead of on a value that would otherwise be found in a portion of header information of the received-message the known value being known to the network device; the received message including encrypted data; and the encrypted data comprising content that is different than content of the header; wherein as a result of the portion of the encryption is based on the known value, the encrypted data may be decrypted no matter which link is chosen.

For example, system 600 comprises: a processor 602; a non-transitory memory 604 storing machine instructions, which when executed causes the processor 602 to: determine at a component of a network device that a field of a received-message is set to a value that indicates that encryption is based on a known value instead of on a value that would otherwise be found in a portion of header information of the received-message (as part of step 618 or 624), the known value being known to the network device; the received message including encrypted data, which is data that was encrypted, where the data is transmitted by a multi-link transmission; and the encrypted data comprising content that is different than content of the header; and decrypt the encrypted data based on the known value (step 618 or 624).

In various embodiments, the system or method may include any of the following features. The network device is an access point. The encrypted data comprises an MPDU, the received-message is associated with an additional authentication block that is based in part on the header.

FIG. 7 shows a table representing the address field contents. The MAC header transmitted over the air does not need to be changed. Two fields are used to indicate the relationship between the messages in the distribution system (DS). For accessing a network having a mesh of nodes, To DS=1 from DS=1 row may be used, in which addresses A1-A4 may be replaced with the relevant MLD MAC address. When a client device is communicating with an access point, one of To DS and From DS is set to 0 and the other is set to 1, depending on the direction of the message. In the table of FIG. 7, To DS=1 and From DS=0 may indicate that message is being sent from the client device to the access point. Whereas, To DS=0 and From DS=1 may indicate that the communication is traveling from the access point to the client. The setting of To DS=0 and From DS=0 is used for control frames or management frames.

Address 1 and address 2 may be the local MAC addresses to transmit and receive on the WM. Hence, address 1 and address 2 can be replaced with MLD MAC addresses for AAD computation. (e.g., A1=non-AP MLD, A2=AP MLD).

AP MLD MAC may use address 2 for generating the nonce, and address 2 may be replaced by AP MLD MAC for AAD computation for the basic A-MSDU case. The non-AP MLD MAC may be used to generate address 2 to compute the nonce. Address 3 may be replaced by AP MLD MAC. For mesh deployment use cases, consider the row in Table 1 with: To DS=1, From DS=1. As before, addresses A1-A4 may be replaced with relevant MLD MAC addresses.

Embodiments described herein result in a system capable of maintaining a clear demarcation between encryption and transmission. Such a system allows there to be a single encryption engine for multiple links and can scale to more links. Such a system allows for faster retransmission without MIC re-computation on other enabled links.

Figure 8:
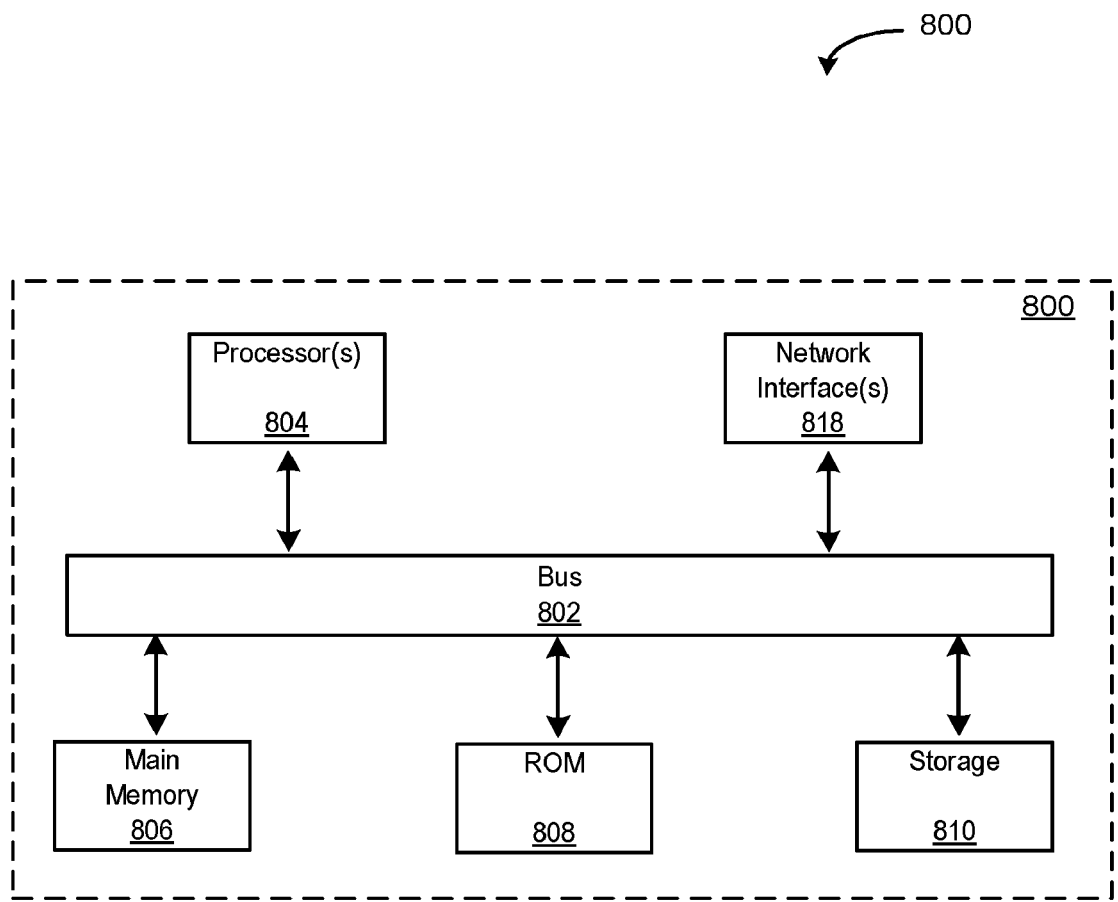
FIG. 8 depicts a block diagram of an example network device in which various of the embodiments described herein may be implemented.

FIG. 8 depicts a block diagram of an example network device 800 in which various of the embodiments described herein may be implemented. The computing device 600 may be part of network device 800. The network device 800 includes a bus 802 or other communication mechanism for communicating information, one or more hardware processors 804 coupled with bus 802 for processing information. Hardware processor(s) 804 may be, for example, one or more general purpose microprocessors. Processor 804 may include hardware processors 602.

Network device 800 may be an MLD or a controller. Network device 800 may be an access point. The network device 800 also includes a main memory 806, such as a random-access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render network device 800 into a special-purpose machine that is customized to perform the operations specified in the instructions. Main memory 804 may store the machine instructions, which when executed implement steps 604-624.

The network device 800 further includes a read only memory (ROM) 808 or another static storage device coupled to bus 802 for storing static information and instructions for processor 804. A storage device 810, such as a magnetic disk, or optical disk, for example, is provided and coupled to bus 802 for storing information and instructions. The network device 800 may implement the techniques described herein using customized hard-wired logic, one or more ASICs or FPGAs, firmware and/or program logic which in combination with the network device causes or programs network device 800 to be a special-purpose machine. The network device 800 also includes a communication interface 818 coupled to bus 802. Communication interface may include multiple communication interfaces, which may be wireless communication interfaces. Different communication interfaces may be capable of communicating on different frequencies. Communication interface 818 facilitate multi-link communications with other devices. Network interface 818 provides a two-way data communication coupling to one or more network links that are connected to one or more local networks.

Each of the processes, methods, and algorithms described in the preceding sections may be embodied in, and fully or partially automated by, code components executed by one or more network devices or computer processors comprising computer hardware.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
a processor;
a non-transitory memory storing machine instructions, which when executed causes the processor to:
receive at a first multi-link component of a network device, encrypted data, the encrypted data having a header that was modified to include a known value, the encrypted data being data that was encrypted when received by the first multi-link component, the encrypted data comprising content that is different than content of the header, the known value being known to the first multi-link component, the known value having a value that is not dependent on a link of multiple links that will be selected, and the header comprising a first field for an address of the first multi-link component, which sends messages to a second multi-link component, and a second field for an address of the second multi-link component, the first and second fields being modified to have the known value that is different than addresses of the first and second multi-link components;
choose, by the first multi-link component, the link from the multiple links to send the data that was encrypted when received; and
send the data that was encrypted when received on the link chosen to a second multi-link component.

2. The system of claim 1, wherein a single encryption key is used to encrypt and decrypt the data for both of the first multi-link component and the second multi-link component.

3. The system of claim 1, the machine instructions, which when executed, further cause the processor to:
process an address that was prepended to the encrypted data.

4. The system of claim 1, wherein a common buffer for block acknowledgement agreement is shared by both the first multi-link component and the second multi-link component.

5. The system of claim 4, the header further comprising a third field that was modified, the third field being for an address of an access point; after being modified, the third field has a value that is different than the address of the access point.

6. The system of claim 5, the header further comprising:
a fourth field for a fourth address, the fourth field being modified to have a value that is different than the fourth address.

7. The system of claim 1, the header and the encrypted data being part of a communication that is compliant with an IEEE 802.11 standard.

8. The system of claim 1, the header being a part of an additional authentication data (AAD) block.

9. The system of claim 1, the encrypted data comprising a message integrity check (MIC).

10. The system of claim 1, the encrypted data comprising a medium access control protocol data unit (MPDU).

11. The system of claim 1, wherein a device from which the data was received is a controller, the controller comprising an encryption component.

12. The system of claim 1, wherein the network device is an access point.

13. A method, comprising:
receiving at a first multi-link component of a network device, encrypted data, the encrypted data having a header that was modified to include a known value, the encrypted data being data that was encrypted when received by the first multi-link component, the encrypted data comprising content that is different than content of the header, the known value being known to the first multi-link component, the known value having a value that is not dependent on a link of multiple links that will be selected, and the header comprising a first field for an address of the first multi-link component, which sends messages to a second multi-link component, and a second field for an address of the second multi-link component, the first and second fields being modified to have the known value that is different than addresses of the first and second multi-link components;
choosing, by the first multi-link component, the link from the multiple links to send the data that was encrypted when received; and
sending the data that was encrypted when received on the link chosen to a second multi-link component.

14. The method of claim 13, further comprising using a single encryption key to encrypt and decrypt the data for both of the first multi-link component and the second multi-link component.

15. The method of claim 13, further comprising processing an address that was prepended to the encrypted data.

16. The method of claim 13, wherein a common buffer for block acknowledgement agreement is shared by both the first multi-link component and the second multi-link component.

17. The method of claim 16, wherein the header further comprises a third field that was modified, the third field being for an address of an access point; after being modified, the third field has a value that is different than the address of the access point.

18. A system, comprising:
a first multi-link component of a network device; and
a second multi-link component;
wherein the first multi-link component:
receives encrypted data, the encrypted data having a header that was modified to include a known value, the encrypted data being data that was encrypted when received by the first multi-link component, the encrypted data comprising content that is different than content of the header, the known value being known to the first multi-link component, the known value having a value that is not dependent on a link of multiple links that will be selected, and the header comprising a first field for an address of the first multi-link component, which sends messages to a second multi-link component, and a second field for an address of the second multi-link component, the first and second fields being modified to have the known value that is different than addresses of the first and second multi-link components;

chooses the link from the multiple links to send the data that was encrypted when received; and sends the data that was encrypted when received on the link chosen to a second multi-link component.

19. The system of claim 18, wherein the header and the message are part of a communication that is compliant with an IEEE 802.11 standard.

20. The system of claim 18, wherein the network device is an access point.

* * * * *